(12) United States Patent
Musat (10) Patent No.: US 8,051,139 B1
(45) Date of Patent: Nov. 1, 2011

(54) ELECTRONIC DOCUMENT CLASSIFICATION USING COMPOSITE HYPERSPACE DISTANCES

(75) Inventor: Claudiu C. N. Musat, Buzau (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 13/095,350

(22) Filed: Apr. 27, 2011

Related U.S. Application Data (62) Division of application No. 11/536,370, filed on Sep. 28, 2006, now Pat. No. 7,945,627.

(51) Int. Cl.
G06F 15/16 (2006.01)

(52) U.S. Cl. ........................ 709/206; 709/200

(58) Field of Classification Search ............... 709/206
See application file for complete search history.

(56) References Cited

U.S. PATENT DOCUMENTS

| | | | | |
|---|---|---|---|---|
| 6,161,130 | A * | 12/2000 | Horvitz et al. | 709/206 |
| 6,901,398 | B1 * | 5/2005 | Horvitz et al. | 709/207 |
| 6,941,321 | B2 * | 9/2005 | Schuetze et al. | 1/1 |
| 6,988,093 | B2 * | 1/2006 | Pic et al. | 1/1 |
| 7,519,565 | B2 * | 4/2009 | Prakash et al. | 706/20 |
| 7,836,134 | B2 * | 11/2010 | Pantalone | 709/206 |
| 7,890,441 | B2 * | 2/2011 | Prakash et al. | 706/20 |
| 2002/0188672 | A1 * | 12/2002 | Janssen et al. | 709/203 |
| 2005/0193073 | A1 * | 9/2005 | Mehr et al. | 709/206 |
| 2005/0198160 | A1 * | 9/2005 | Shannon et al. | 709/206 |
| 2005/0198182 | A1 * | 9/2005 | Prakash et al. | 709/206 |
| 2008/0077570 | A1 * | 3/2008 | Tang et al. | 707/5 |
| 2008/0140781 | A1 * | 6/2008 | Bocharov et al. | 709/206 |

OTHER PUBLICATIONS

Serge Dulucq, Touzer Helene, "Analysis of Tree Edit Distance Algorithms", LaBri-Universit Bordeaux, pp. 1-13.*

* cited by examiner

*Primary Examiner* — John Follansbee
*Assistant Examiner* — Anthony Mejia
(74) *Attorney, Agent, or Firm* — Law Office of Andrei D Popovici, PC (57) ABSTRACT

In some embodiments, a layout-based electronic communication classification (e.g. spam filtering) method includes generating a layout vector characterizing a layout of a message, assigning the message to a selected cluster according to a hyperspace distance between the layout vector and a central vector of the selected cluster, and classifying the message (e.g. labeling as spam or non-spam) according to the selected cluster. The layout vector is a message representation characterizing a set of relative positions of metaword substructures of the message, as well as metaword substructure counts. Examples of metaword substructures include MIME parts and text lines. For example, a layout vector may have a first component having scalar axes defined by numerical layout feature counts (e.g. numbers of lines, blank lines, links, email addresses), and a second vector component including a line-structure list and a formatting part (e.g. MIME part) list.

18 Claims, 11 Drawing Sheets

ELECTRONIC DOCUMENT CLASSIFICATION USING COMPOSITE HYPERSPACE DISTANCES

RELATED APPLICATION DATA

This application is a divisional of U.S. patent application Ser. No. 11/536,370, filed Sep. 28, 2006 now U.S. Pat. No. 7,945,627, entitled "Layout-Based Electronic Communication Filtering Systems and Methods," which is herein incorporated by reference.

BACKGROUND

The invention relates to systems and methods for classifying electronic communications, and in particular to systems and methods for filtering unsolicited commercial electronic mail (spam).

Unsolicited commercial electronic communications have been placing an increasing burden on the users and infrastructure of electronic mail (email), instant messaging, and phone text messaging systems. Unsolicited commercial email, commonly termed spam or junk email, forms a significant percentage of all email traffic worldwide. Spam takes up valuable network resources, affects office productivity, and is considered annoying and intrusive by many computer users.

Software running on an email user's or email service provider's system may be used to classify email messages as spam or non-spam. Spam messages can then be directed to a special folder or deleted. Several approaches have been proposed for identifying spam messages, including matching the message's originating address to lists of known offending or trusted addresses (techniques termed black- and white-listing, respectively), searching for certain words or word patterns (e.g. refinancing, Viagra®, weight loss), and analyzing message headers. Experienced spammers have developed countermeasures to such classification tools, such as misspelling certain words (e.g. Vlagra), using digital images instead of words, and inserting unrelated text in spam messages. Such countermeasures have made the identification of spam more difficult.

Conventional anti-spam filtering approaches include black- and white-listing email addresses, as well as filtering based on keywords. For example, in U.S. Pat. No. 6,421,709, McCormick et al. describe a system and method of filtering junk e-mails using a first filter and a second filter. The first filter includes a list of disallowed sender email addresses and character strings. The second filter includes allowed sender names and character strings which the user wishes to receive. The first filter eliminates emails from the system, while the second filter directs emails to the user's inbox.

In U.S. Pat. No. 6,161,130, Horvitz et al. describe a system which scans messages for a number of predefined features such as word-based features, capitalization patterns, and specific punctuation. The scan yields an N-dimensional feature vector, which is fed into a probabilistic classifier. The classifier is trained for prior content classification, and effectively bins the message into one of several classes, e.g., spam or non-spam, according to a computed confidence level. A user trains the classifier by manually labeling a set of messages as legitimate or spam.

SUMMARY

According to one aspect, a non-transitory computer-readable medium encodes instructions which, when executed by a computer system, cause the computer system to parse an electronic text document to generate a document vector for the electronic text document, determine a plurality of composite hyperspace distances between the document vector and a plurality of reference vectors, and classify the electronic text document according to at least one of the plurality of composite hyperspace distances. The document vector includes a feature count component and a feature position component. The feature count component includes a plurality of feature count indicators for the electronic text document. The feature position component includes an ordered list or tree of document substructure indicators, each document substructure indicator denoting a type of substructure in the electronic text document. A position of each document substructure indicator in the ordered list or tree characterizes a position of a corresponding substructure in the electronic text document. Each composite hyperspace distance is defined between the document vector and a reference vector of the plurality of reference vectors. Each composite hyperspace distance is a function of a first distance dependent on the feature count component of the document vector, and of a second distance dependent on the feature position component of the document vector. The first distance is a Euclidean distance or a Manhattan distance, and the second distance is an edit distance.

According to another aspect, a method comprises employing a computer system to parse an electronic text document to generate a document vector for the electronic text document, determine a plurality of composite hyperspace distances between the document vector and a plurality of reference vectors, and classify the electronic text document according to at least one of the plurality of composite hyperspace distances. The document vector includes a feature count component and a feature position component. The feature count component includes a plurality of feature count indicators for the electronic text document. The feature position component includes an ordered list or tree of document substructure indicators, each document substructure indicator denoting a type of substructure in the electronic text document. A position of each document substructure indicator in the ordered list or tree characterizes a position of a corresponding substructure in the electronic text document. Each composite hyperspace distance is defined between the document vector and a reference vector of the plurality of reference vectors. Each composite hyperspace distance is a function of a first distance dependent on the feature count component of the document vector, and a second distance dependent on the feature position component of the document vector. The first distance is a Euclidean distance or a Manhattan distance, and the second distance is an edit distance.

According to another aspect, a non-transitory computer-readable medium encodes instructions which, when executed by a computer system, cause the computer system to generate an electronic communication feature count indicator comprising a plurality of feature counts for the electronic communication; generate a text line structure indicator characterizing a line structure of the electronic communication, the text line structure indicator comprising an ordered list or tree of text line type indicators, a position of each text line type indicator in the ordered list or tree being indicative of a position of a corresponding text line type in the electronic communication; determine a composite hyperspace distance between a vector representing the electronic communication and a predetermined vector, the hyperspace distance being a function of a Euclidean-space distance dependent on the feature count indicator, and of an edit distance dependent the text line structure indicator; and classify the electronic communication according to the composite hyperspace distance.

According to another aspect, a method comprises employing a computer system to generate an electronic communication feature count indicator comprising a plurality of feature counts for the electronic communication; generate a text line structure indicator characterizing a line structure of the electronic communication, the text line structure indicator comprising an ordered list or tree of text line type indicators, a position of each text line type indicator in the ordered list or tree being indicative of a position of a corresponding text line type in the electronic communication; determine a composite hyperspace distance between a vector representing the electronic communication and a predetermined vector, the hyperspace distance being a function of a Euclidean-space distance dependent on the feature count indicator, and of an edit distance dependent the text line structure indicator; and classify the electronic communication according to the composite hyperspace distance.

BRIEF DESCRIPTION OF THE DRAWINGS

The foregoing aspects and advantages of the present invention will become better understood upon reading the following detailed description and upon reference to the drawings where:

FIG. 1-A shows an exemplary electronic communication system including multiple client computers each having a message classification subsystem (e.g. application) according to some embodiments of the present invention.

FIG. 1-B shows an exemplary electronic communication system including a mail server having a message classification subsystem capable of classifying messages sent to multiple clients, according to some embodiments of the present invention.

FIG. 2-A illustrates an exemplary classification subsystem distinct from an electronic mail application, according to some embodiments of the present invention.

FIG. 2-B illustrates an exemplary classification subsystem forming part of an electronic mail application, according to some embodiments of the present invention.

FIG. 6-A illustrates an exemplary email message and a corresponding formatting part layout vector according to some embodiments of the present invention.

FIG. 6-B illustrates an exemplary text part of an email message and a corresponding text layout vector according to some embodiments of the present invention.

FIG. 6-C illustrates an exemplary layout feature vector corresponding to an email message according to some embodiments of the present invention.

FIG. 6-D shows an exemplary tree structure representation of an email message layout feature vector according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a cluster centroid is a central point of a cluster. The coordinates of such a central point may be, without limitation, averages or other combinations (with or without weights) of cluster member coordinates, median or other representative cluster point coordinates, or combinations of averaged and representative point coordinates. For example, an exemplary centroid may include a set of cluster-averaged coordinates along a first set of axes, and a set of median/medoid cluster coordinates along a second set of axes. Unless otherwise specified, the term hyperspace encompasses any space having at least two axes. Unless otherwise specified a list encompasses any ordered concatenation/sequence of indicators; a list may be represented in source code as an array data structure (e.g. an array of characters) or a string data structure, among others. Unless otherwise specified, the term spam is not limited to email spam, but encompasses non-legitimate or unsolicited commercial electronic communications such as email, instant messages, and phone text messages, among others. Metaword substructures of a message are substructures of a higher level of abstraction than merely characters or words; examples of metaword substructures include message lines, addresses, hyperlinks, and differently-formatted message parts (e.g. MIME parts). Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 1:
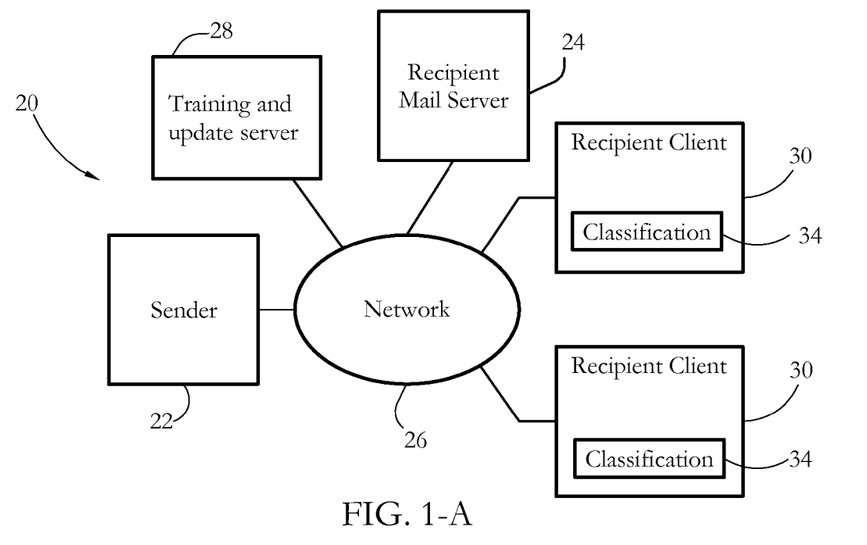

FIG. 1-A shows an electronic communication and classification system 20 according to some embodiments of the present invention. System 20 may be an electronic email (email), instant messaging (IM), or other electronic communication system. For clarity, the following discussion will focus in particular on an electronic email system. System 20 includes a sender computer system 22, a recipient mail server 24, a training and update server 28, and a plurality of recipient client computer systems 30. Sender system 22 may include a sender mail server and/or one or more sender client computer systems. A network 26 connects sender system 22, recipient mail server 24, training and update server 28, and recipient client systems 30. Network 26 may be a wide-area network such as the Internet. Parts of network 26, for example a part of network 26 interconnecting recipient client systems 30, may also include a local area network (LAN). Each recipient client system 30 includes a classification engine 34, which is used to classify electronic communications as described in detail below.

FIG. 1-B shows an electronic communication and classification system 20' according to some embodiments of the present invention. System 20' differs from the system 20 shown in FIG. 1-A in that a common classification engine 34' is provided on a recipient mail server 24'. Recipient client systems 30' receive pre-classified messages from server 24', and do not include individual classification programs.

An email message sent by sender system 22 to one or more email addresses is received at recipient mail server 24, and then sent or made available otherwise (e.g. through a web interface) to recipient client systems 30, 30'. The message is classified into one of a plurality of classes by classification engines 34, 34'. In some embodiments, the classes include one or more classes of unsolicited commercial email (spam), and one or more classes of non-spam (legitimate or unknown) email. In a simple embodiment, defined classes may include spam, legitimate, and unknown/undetermined. In some embodiments, classes of legitimate email may include personal and work, while spam classes may include product offers and phishing, among others. In the configuration of FIG. 1-A, the message classification is performed individually on each client computer 30. In the configuration of FIG. 1-B, the message classification may be performed for multiple clients by mail server subsystem 24'.

Figure 2:
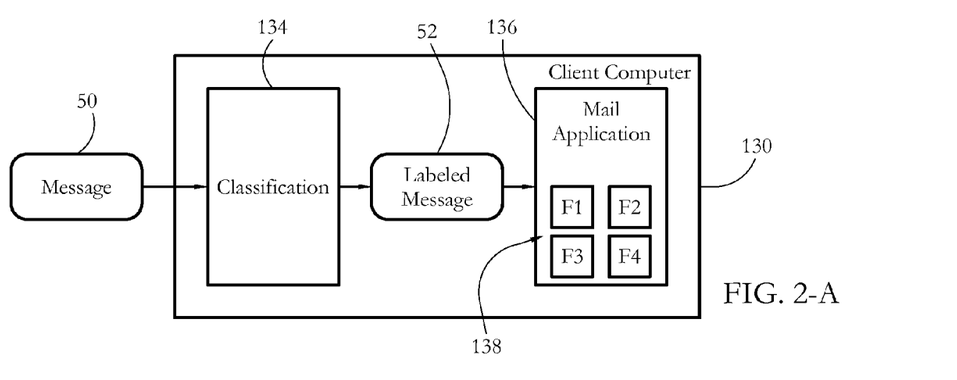

FIG. 2-A shows an exemplary recipient client computer system 130 including a classification engine 134 separate from an email application 136, according to some embodiments of the present invention. In some embodiments, classification engine 134 may be a stand-alone application, or may be an antispam module of a security suite having antivirus, firewall, and other modules. Classification engine 134 receives an email message 50, and transfers a labeled (classified) message 52 to email application 136. The labeled message may include a classification label, which may be placed in a header field of labeled message 52. In some embodiments, classification engine 134 may transfer to mail application 136 a classification label and an indicator of an association of the label to message 50. Mail application 136 places labeled message 52 in one of a plurality of folders 138 (labeled F1-F4 in FIG. 2-A) according to the classification label. Folders 138 may include one or more spam folders and one or more non-spam folders. A user may interact with classification engine 134 and/or mail application 136 to manually alter the classification of given messages.

FIG. 2-B shows an exemplary recipient client computer system 230 including a classification engine 234 integrated in an email application 236. A message 50 received by classification engine 234 is directed to one of a plurality of folders 238 directly by classification engine 234 or by other routines of mail application 236. Folders 238 may include one or more spam folders and one or more non-spam folders. A user may interact with email application 236 to manually alter the classification of given messages, for example by moving the messages from one folder to another.

Figure 3:
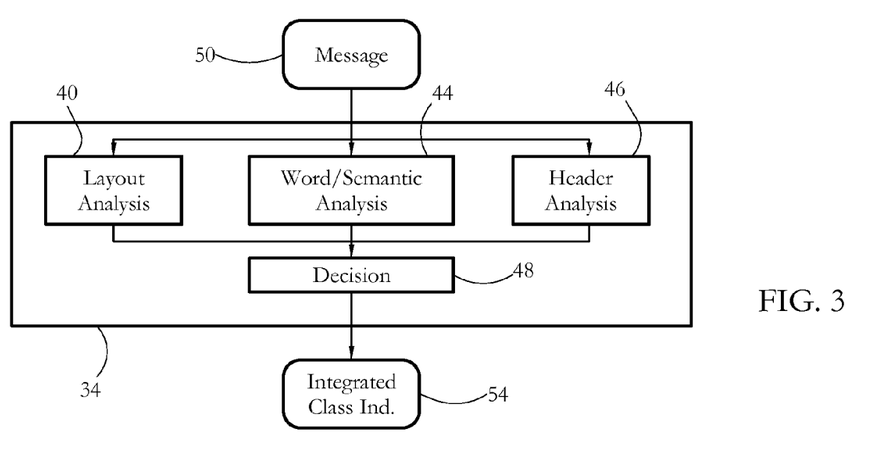
FIG. 3 shows a high-level diagram of an electronic communication classification subsystem according to some embodiments of the present invention.

FIG. 3 shows a diagram of a classification engine 34 according to some embodiments of the present invention. Classification engine 34 includes a layout analysis module 40, a word/semantic analysis module 44, a header analysis module 46, and a composite decision module 48 connected to layout analysis module 40, word/semantic analysis module 44, and header analysis module 46. Analysis modules 40, 44, 46 receive a message 50, analyze the layout, word/semantic characteristics, and header of message 50, and generate corresponding layout, word/semantic, and header classification indicators, respectively. Analyzing the header of message 50 may include identifying the sender address as a permitted or non-permitted address. Word/semantic analysis module 44 may include detection of certain known keywords (e.g. Viagra) or phrases commonly associated selectively with spam. Composite decision module 48 receives the multiple aspect indicators from analysis modules 40, 44, 46 and generates an integrated classification indicator 54. In some embodiments, integrated classification indicator 54 and the aspect indicators generated by analysis modules 40, 44, 46 may include numerical scores and/or binary (yes/no) values.

Figure 4:
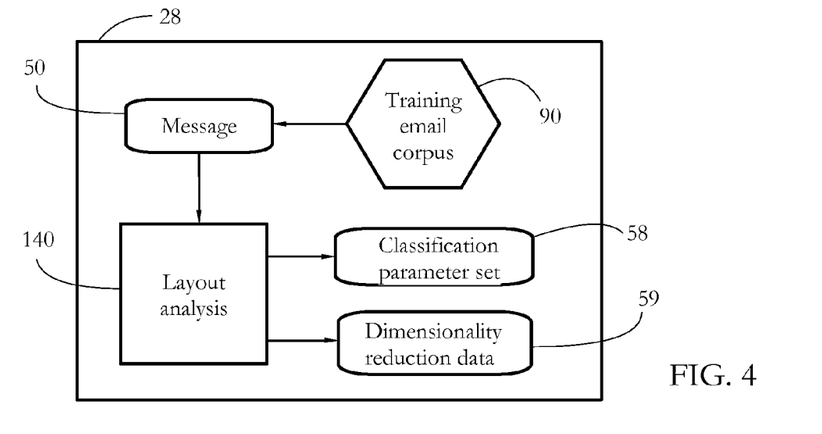
FIG. 4 shows an internal structure of a training and update server of the system of FIGS. 1-A-B according to some embodiments of the present invention.

FIG. 4 shows a high-level diagram of training and update server 28 according to some embodiments of the present invention. Training and update server 28 includes a layout analysis module 140. Layout analysis module 140 processes messages 50 from a training email corpus 90, and produces a set of classification parameters 58 to be used by client classification engines 34, 34'. In some embodiments, the training process includes a dimensionality reduction step, and layout analysis module 140 generates a dimensionality reduction data set 59. In some embodiments, training email corpus 90 includes multiple messages, pre-classified as members of desired classes (e.g. spam or non-spam).

Figure 5:
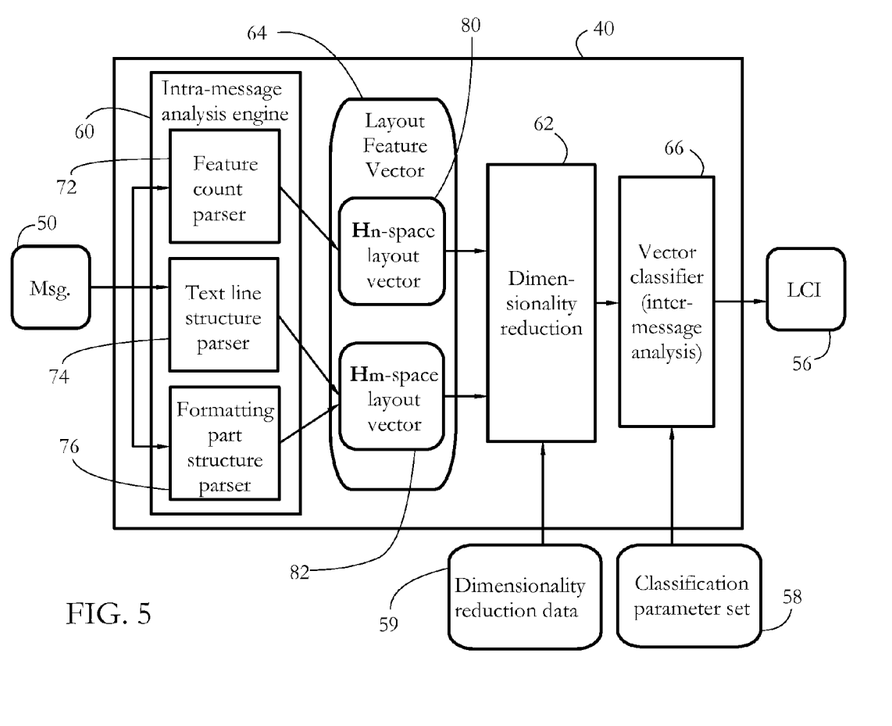
FIG. 5 shows a layout analysis engine of the classification subsystem of FIG. 3 according to some embodiments of the present invention.

FIG. 5 shows a diagram of layout analysis module 40 according to some embodiments of the present invention. Layout analysis module 40 generates a layout classification indicator (LCI) 56 for a message 50 using classification parameter set 58 generated from a training process as described in detail below. Layout analysis module 40 includes an intra-message analysis engine 60 that parses message 50 to generate a layout feature vector 64. Layout analysis module 40 further includes a vector classifier 66 that generates LCI 56 by processing layout feature vector 64 and classification parameter set 58. Generating LCI 56 effectively assigns message 50 to a class. Layout analysis module 40 further includes a dimensionality reduction module 62, which reduces a set of dimensions of layout feature vector 64 before sending layout feature vector 64 to vector classifier 66. Dimensionality reduction module 62 reduces the size of layout feature vector 64 according to dimensionality reduction data 59. In some embodiments, data sets 58, 59 are stored on training and update server 28 and are made available to client classification engines 34, 34' via network 26. In some embodiments, data sets 58, 59 are transferred to client computers 30 or mail server 24' via software updates.

Intra-message analysis engine 60 includes a feature count parser 72, a text line structure parser 74, and a formatting part structure parser 76. Feature count parser 72 generates an $H_n$-space layout vector 80, while text line structure parser 74 and formatting part structure parser 76 generate components of an $H_m$-space layout vector 82. In some embodiments, a hyperspace $H_n$ has a message-independent number of axes n. Each $H_n$-space axis is given by a layout feature count or other quantifiable property such as a message size or a total number of new lines, blank lines, website links, email addresses, images, or attached files. $H_n$-space layout vector 80 is a message-specific vector in the n-dimensional hyperspace $H_n$ characterizing a set of message layout feature counts. For example, in a simple 2-D $H_n$ space with axes defined by the total number of new lines and the number of blank lines, a message having 23 new lines and 4 blank lines may correspond to an $H_n$-space vector (23,4).

In some embodiments, a hyperspace $H_m$ is a 2-D space, with a first axis defining a text line structure of a message, and a second axis defining a formatting part structure of the message. An $H_m$-space vector has two scalar components, each including a string having a message-dependent length. The $H_m$-space vector characterizes the absolute and/or relative positions of metaword message features including text features (e.g. short lines, long lines, blank lines, website links, and email addresses), as well as positions of differently-formatted parts of the message (e.g., MIME parts), as described in detail below. The hyperspaces $H_n$ and $H_m$, as well as the layout feature vector 64, can be understood better by considering an exemplary email message.

Figure 6:
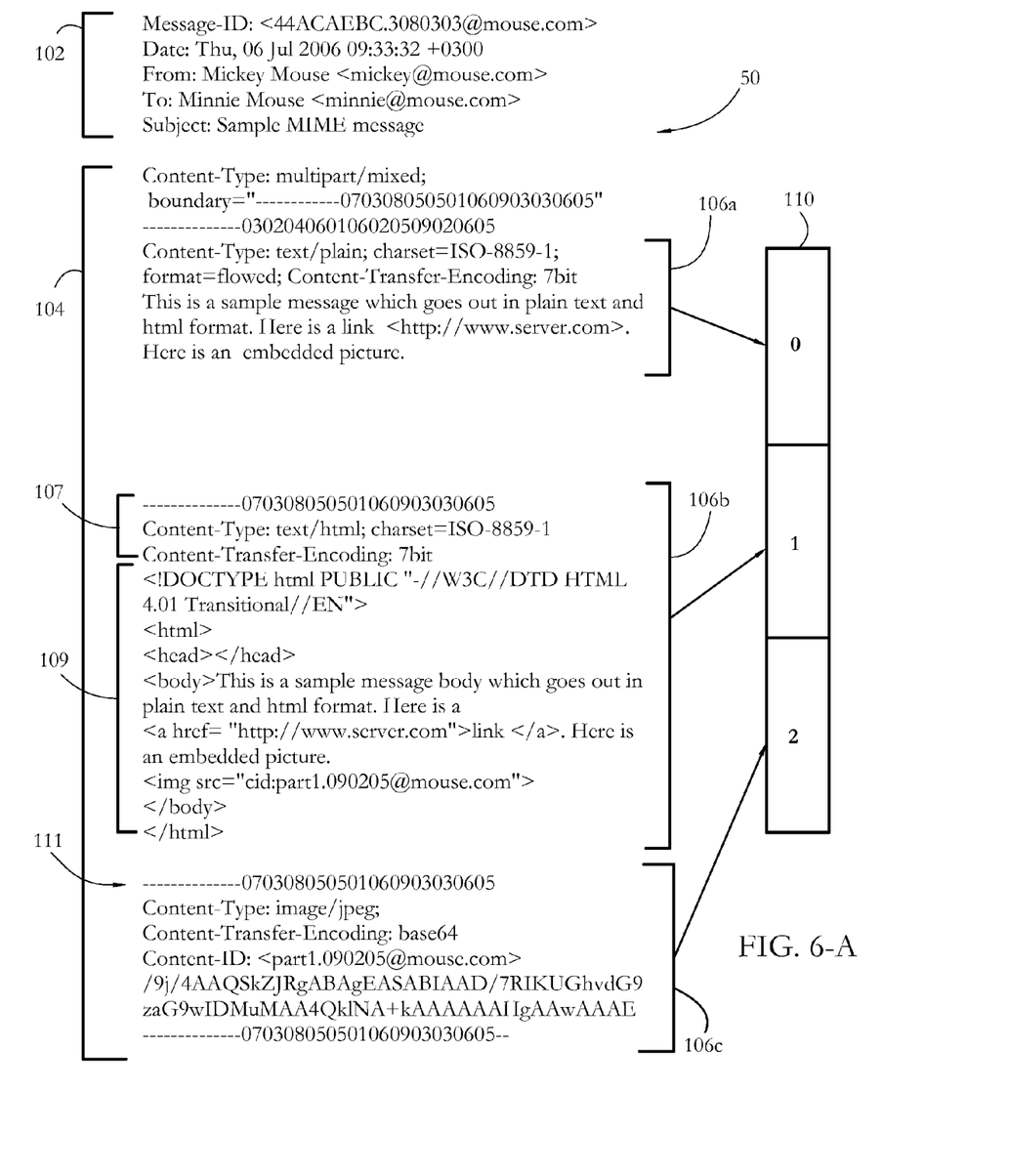

FIG. 6-A shows a raw/source view of an exemplary email message 50. Email message 50 includes a header 102 and a message body 104. Header 102 may includes fields denoting the message's path, sender, recipient, and date, among others. Message body 104 contains multiple differently-formatted parts (e.g. MIME parts): a plain-text part 106a, an HTML part 106b, and an image part 106c. In the MIME message format, every MIME part of a message contains a header and a data body; for example, HTML part 106b includes a header 107 and a data body 109. Distinct MIME parts are separated by part boundary markers 111. Formatting part structure parser 76 (FIG. 5) identifies various formatting parts 106a-c within the incoming message 50, and arranges the formatting parts in an ordered list. In some embodiments, every formatting part receives a label (e.g., 0 for plain text, 1 for HTML, 2 for image/jpeg, etc.). The ordered list of formatting-part labels forms a formatting-part structure string 110, shown in FIG. 6-A.

FIG. 6-B shows an exemplary body 108 of a text part of a message, including a number of blank and non-blank lines, a website link, and an email address. A line-structure string 112 includes an ordered list of text line identifiers representing a text line-structure of the message. String 112 has a value 134000, where the number 1 signifies a short line ("Hi, read this:"), the number 3 signifies a hyperlink ("http://www.b-.com/), the number 4 denotes an email address ("a@b.com") and the number 0 denotes a blank line. String 112 is generated by text line structure parser 74, shown in FIG. 4. In general, different messages may have corresponding layout structure strings of different lengths. Depending on the communication protocol, the body of the text part of the message may not contain explicit line breaks (denoted by the character '\n' in FIG. 6-B), in which case such line breaks may be generated by line structure parser 74. In some embodiments, line structure parser 74 divides the body of text into individual lines having a fixed number of characters (e.g. 72 or 80), prior to analyzing the text line-structure of the message. In some embodiments, line structure parser 74 may use additional formatting information stored in an HTML-part of the message, if available, to decide upon the line-structure of the message.

FIG. 6-C shows an exemplary structure of $H_m$-space layout vector 82 corresponding to a message. In some embodiments, $H_m$-space layout vector 82 includes scalar components formed by line-structure string 112 and formatting part-structure string 110.

In some embodiments, a tree structure may be used to represent the line and/or formatting part structures of a message. FIG. 6-D shows an exemplary tree structure layout representation 82' including a root node 114, a set of first level nodes 116, and a set of second level nodes 118. In some embodiments, a tree structure may include fewer or more levels than shown in FIG. 6-D, and fewer or more nodes at each level. In some embodiments, root node 114 represents the message and first level nodes 116 represent formatting (e.g. MIME) parts of the message. Second- and higher-level nodes may represent formatting parts, message lines, and/or other metaword substructures. Each node in the tree structures includes an identifier of its corresponding structure. For example, for the message shown in FIG. 6-A, the first-level nodes 116 may hold the values 0, 1, 2, respectively, corresponding to plain text, html, and image MIME parts. An $H_m$-space distance between two trees may be set to be an edit distance between the trees, i.e. a minimum cost to transform one tree into the other using elementary operations such as substitution, insertion, and deletion. In some embodiments, an inter-tree edit distance may be determined using a Zhang-Shasha or Klein algorithm.

Figure 7:
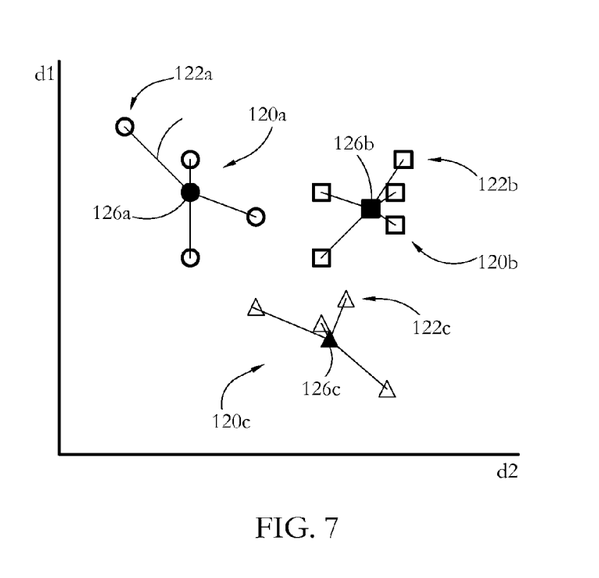
FIG. 7 shows an exemplary set of three message layout collections (clusters) in a 2-D feature space according to some embodiments of the present invention.

In some embodiments, message analysis is performed in a combined $H_{n+m}$ space, by analyzing distances between the (n+m)-dimensional layout vector of a message and a set of (n+m)-dimensional representative collection (cluster) vectors defining different layout classes. FIG. 7 shows three exemplary vector clusters 120a-c formed by message layout vectors 122a-c, respectively, in a simple 2-D space having two axes, d1 and d2. Clusters 120a-c define corresponding cluster centroids 126a-c, which can be used to represent the corresponding clusters. Each centroid 126a-c is a vector characterized by the shortest total distance (smallest distance sum) in $H_{n+m}$ space to all the points of its corresponding cluster 120a-c. Centroids 126a-c can be thought of as the centers of mass of clusters 120a-c. In some embodiments, clustering in the combined $H_{n+m}$ space may be performed using a k-means method in $H_n$ space in conjunction with a k-medoids method in $H_m$ space, as described below.

Figure 8:
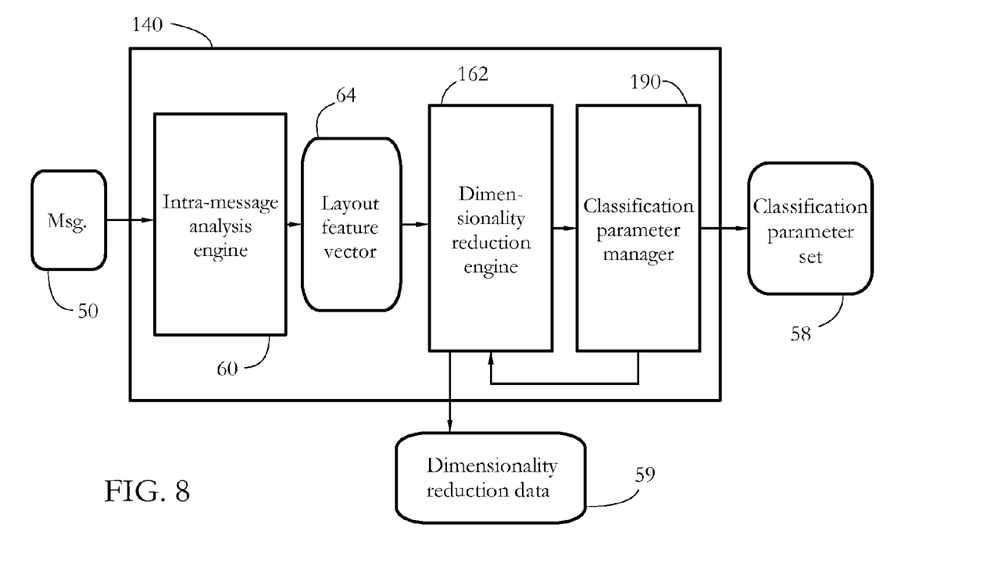
FIG. 8 shows an internal structure of a layout analysis engine running on the training and update server of FIG. 4 according to some embodiments of the present invention.

FIG. 8 shows an exemplary internal structure of layout analysis module 140 (FIG. 4) according to some embodiments of the present invention. Layout analysis module '140 includes an intra-message analysis engine 60, which takes a message 50 as input and generates a layout feature vector 64. The operation of intra-message analysis engine 60 and the structure of layout feature vector 64 may be identical to the ones described above for client-side classification engines 34, 34'. Layout analysis module 140 further includes a classification parameter manager 190, which updates and maintains classification parameter set 58.

In some embodiments, layout analysis module 140 also includes a dimensionality reduction engine 162, which analyzes layout feature vectors 64 corresponding to training message corpus 90 and interacts iteratively with classification parameter manager 190. A dimensionality reduction process reduces the dimension of the layout feature vector 64 while optimizing classification performance. A dimensionality reduction process may serve to eliminate or transform a set of dimensions in $H_n$, $H_m$, and/or $H_{n+m}$ space that are not useful in differentiating between spam and non-spam. For example, if a particular feature count in $H_n$ space (e.g. number of blank lines) or substructure type (e.g. blank line substructures) in $H_m$-space is not useful in distinguishing between spam and non-spam, the variable type may be eliminated. In some embodiments, dimensionality reduction engine 162 may use data reduction algorithms such as principal component analysis (PCA) or discriminant correspondence analysis (LDA) to return a modified layout feature vector. In some embodiments, the data reduction algorithm and optimized engine parameters are stored as dimensionality reduction data 59, to be used by client-side layout analysis modules 40. A dimensionality reduction algorithm need not directly eliminate vector space axes, but may linearly transform some axes to generate new, transformed axes in a lower-dimensional space.

In some embodiments, a dimensionality reduction process may be applied to an assembled feature vector 64 and/or to parsing results. Applying a dimensionality reduction process to parsing results generates optimizes a subset of the parsing results returned by intra-message analysis engine 60. Applying such a process to an assembled vector transforms the assembled vector into a new vector.

In some embodiments, a training process run by classification parameter manager 190 includes determining an initial number of layout vector clusters and an initial set of cluster centroids for a given pre-classified training message corpus 90 having N messages. The training process serves to define a set of clusters that best separate the desired classes of messages. In an anti-spam filter, the training process results in labeling some clusters as spam and some clusters as non-spam. After training, new messages are classified by assigning the messages to clusters: messages assigned to spam clusters are labeled as spam, while messages assigned to non-spam clusters are labeled as non-spam.

Figure 9:
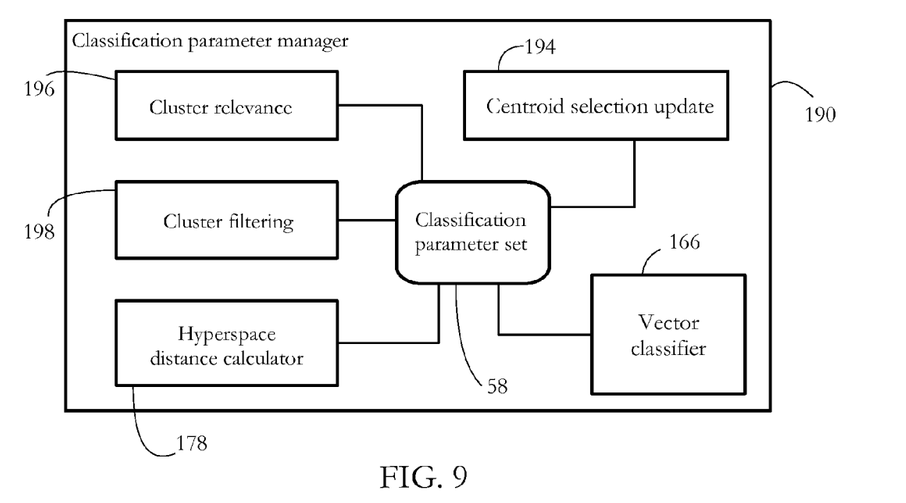
FIG. 9 shows an exemplary internal structure of a classification parameter manager of the layout analysis engine of FIG. 8, according to some embodiments of the present invention.

FIG. 9 shows a diagram of classification parameter manager 190 (FIG. 8), according to some embodiments of the present invention. Manager 190 includes a hyperspace distance calculator 178, a vector classifier 166, a cluster relevance manager 196, a centroid selection/update manager 194, and a cluster filtering manager 198, all connected to classification parameter set 58. Classification parameter set 58 includes a centroid vector and cluster member vectors for each of a plurality of clusters. In some embodiments, classification parameter set 58 further include a set of computed distances in $H_n$-space, $H_m$-space, and/or $H_{n+m}$-space between stored layout vectors and corresponding cluster centroids, as well as a relevance value for each cluster. In some embodiments, the set of distances includes an average composite distance between each centroid and its corresponding cluster points.

Figure 10:
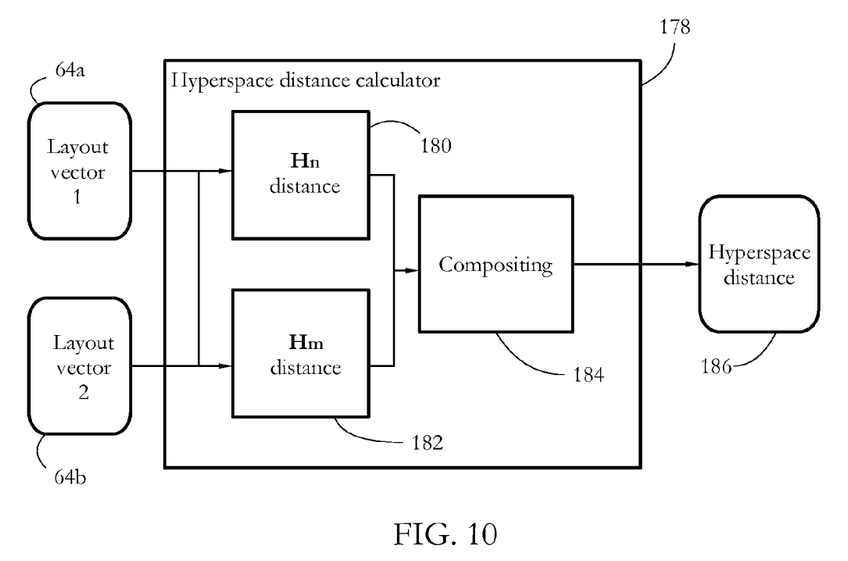
FIG. 10 shows an exemplary hyperspace distance calculator according to some embodiments of the present invention.

FIG. 10 shows a diagram of hyperspace distance calculator 178 according to some embodiments of the present invention. Hyperspace distance calculator 178 calculates composite hyperspace distances between a current message representation (layout feature vector 64) and a plurality of cluster centroids. Hyperspace distance calculator includes an $H_n$-space distance calculator 180, an $H_m$-space distance calculator 182, and a composite distance calculator 184 connected to calculators 180, 182. $H_n$-space distance calculator 180 determines an $H_n$-space distance between the $H_n$-space layout vectors 80 of any two layout feature vectors 64a,b. $H_m$-space distance calculator 182 determines an $H_m$-space distance between the $H_m$-space layout vectors 82 of any two layout feature vectors 64a,b. Composite distance calculator 184 receives the two distances determined by calculators 180, 182, and sums the two distances to generate a composite distance between the two $H_{n+m}$-space layout feature vectors 64a,b. Commonly, layout vector 64a represents the currently analyzed message, while vector 64b represents a cluster centroid of classification parameter set 58.

In some embodiments, each distance between two vectors/locations in the combined $H_{n+m}$ space is defined as a sum of the $H_n$-space distance between the $H_n$-space components of the two vectors, and the $H_m$-space distance between the $H_m$-space components of the two vectors. In some embodiments, each $H_n$-space distance may be defined as an Euclidean or Manhattan distance. A Euclidean distance $D_E(v_1, v_2)$ between two vectors $v_1, v_2$ is:

$$D_E(v_1, v_2) = \sqrt{\sum_i (x_{1,i} - x_{2,i})^2}, \quad [1a]$$

wherein $x_{1,i}$ and $x_{2,i}$ are the coordinates of the two vectors along the ith axis. A Manhattan distance $D_M(v_1, v_2)$ between two vectors $v_1, v_2$ is:

$$D_M(v_1, v_2) = \sum_i |x_{1,i} - x_{2,i}|. \quad [1b]$$

In some embodiments, each $H_m$-space distance between two variable-length strings may be defined as an edit (Levenshtein) distance, i.e. the smallest number of single-character insertions, deletions, and substitutions needed to change one string into another. The $H_n$-space and $H_m$-space distances, as well as the different components of the $H_n$-space distances, may be scaled as appropriate to achieve desired relative weightings for the corresponding axes.

Cluster relevance manager 196 (FIG. 9) maintains a relevance indicator for each cluster in classification parameter set 58. Vector classifier 166 (FIG. 9) assigns the current message to a selected cluster according to the composite distances calculated by hyperspace distance calculator 178 and the relevance indicators generated by cluster relevance manager 196. Centroid selection/update manager 194 selects an initial set of cluster centroids, and updates the cluster centroids as new vectors are assigned by vector classifier 188 to the clusters in classification parameter set 58. Cluster filtering manager 198 performs a set of filtering operations on the clusters of classification parameter set 58. The operations performed by classification parameter manager 190 are explained in further detail below.

Figure 11:
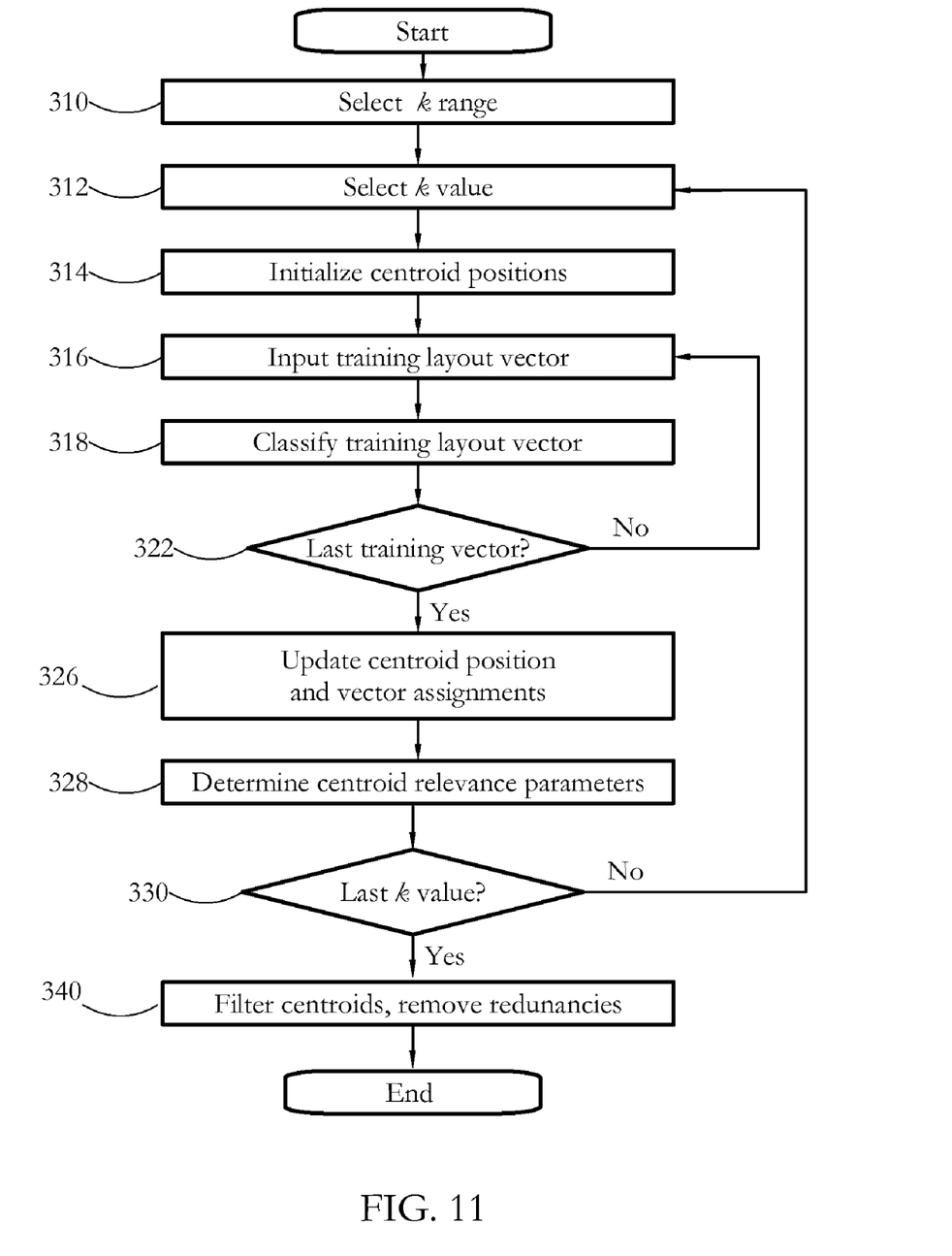
FIG. 11 shows a sequence of steps performed by the classification parameter manager of FIG. 9 in a training process according to some embodiments of the present invention.

FIG. 11 shows a sequence of steps performed by classification parameter manager 190 during an initial training/initialization process according to some embodiments of the present invention. The initialization process generates a set of clusters and corresponding centroid positions given an initial number of pre-classified messages and corresponding layout vectors. In steps 310 and 312, centroid selection/update manager 194 (FIG. 9) selects a tentative range of centroid numbers k and an initial centroid number to be evaluated, respectively. In some embodiments, a tentative central number of centroids K is chosen according to the number N of messages in the training message corpus, and the evaluation range is centered around K ($k \in [K-\epsilon, K+\epsilon]$). In some embodiments, K is set to be equal to about $\sqrt{2N}$. It was empirically observed that centering the evaluation range around $\sqrt{2N}$ tended to yield better classification results than centering the evaluation range around $\sqrt{N}$. Each k value in the range is then evaluated as described below.

In a step 314, centroid selection/update manager 194 determines a set of initial positions in $H_{n+m}$-space for k centroids. In some embodiments, the initial positions are chosen to be actual layout vectors extracted from the training message corpus. For example, each centroid may be taken to be the layout vector of an email message deemed representative of an email message class. In some embodiments, the initial centroid positions are chosen to be the set of k vectors within the training corpus 90 which are the farthest apart in $H_{m+n}$ space, i.e. whose sum of inter-vector distances is maximal.

In a step 316 a new training layout vector 64 is input and assigned to the closest centroid/cluster by vector classifier 166 (step 318). In a step 322 (FIG. 11), centroid selection/update manager 194 (FIG. 9) checks whether all training vectors have been assigned. If no, steps 316, 318, 322 are performed for the next training layout vector.

After all messages in training corpus 90 have received an initial assignment, centroid selection/update manager 194 re-computes the centroid position of all clusters to reflect the addition of new vectors, and re-assigns the vectors of each cluster to new clusters if needed (step 326). A vector may be reassigned if its closest centroid changes as a result of the change in position of its own centroid and of the centroids of neighboring clusters. Re-computing the centroid position comprises re-computing the $H_n$-space and $H_m$-space centroid positions. The new $H_n$-space centroid coordinates may be set to be the new cluster averages along each $H_m$-space axis. In some embodiments, the new $H_m$-space centroid position may be set to the a $H_m$-space component of a layout vector having a minimal average $H_m$-space distance to the other layout vectors in the cluster. For example, in a 2-D $H_m$-space having axes defined by a text line structure and a formatting part structure, the line structure string 112 (FIG. 6-B) of the new centroid position is set to the line structure string of a selected cluster vector that yields a minimum average edit distance to the other cluster vectors. Similarly, the formatting part structure string 110 (FIG. 6-A) of the new centroid position is set to the formatting part structure string of a selected cluster vector that yields a minimum average edit distance to the other cluster vectors. The vector reassignment process may continue iteratively until vector assignments and centroid positions become stable. In a real-time process, the process of re-computing the $H_m$-space centroid coordinates may be terminated after a set maximum time has elapsed or after a set number of operations have been performed, rather than after all cluster points have been evaluated as candidate sources for the $H_m$-space centroid coordinates.

In a step 328, cluster relevance manager 196 (FIG. 9) determines a relevance indicator for each cluster by analyzing the correspondence between the clusters and a pre-determined message classification (e.g. known spam and non-spam messages in the training corpus). A cluster's relevance score provides an indication of the cluster's usefulness as a predictor of a meaningful message classification for the desired message classes. For example, clusters that include 0% or 100% spam messages will tend to be highly useful for identifying spam, while clusters that include 50% spam and 50% non-spam will tend to be of limited usefulness in identifying spam. The cluster relevance parameter is chosen to quantify the degree of similarity between cluster members with respect to pre-defined message classes.

In some embodiments, a relevance indicator $\eta$ for each cluster/centroid may be defined as:

$$\eta = \rho P N_{total}, \quad [2]$$

where $\rho$ represents a cluster density, P represents a proportion of cluster members that are known to be members of a message class (e.g. spam) that predominates in the cluster, and $N_{total}$ is the total number of cluster members. The cluster density $\rho$ may be defined as the inverse of an average distance $\overline{D}$ between the cluster layout vectors and the cluster centroid:

$$\rho = \frac{1}{\overline{D}}. \quad [3]$$

The proportion P may be defined as a ratio of the dominant class count to the total cluster count:

$$P = \frac{N_{dominant}}{N_{total}} \quad [4]$$

wherein $N_{dominant}$ is the number of cluster points that are members of a dominant message class. For example, if a 10-message cluster contains 7 spam emails and 3 non-spam emails, its proportion P according to eq. [4] is 0.7. Similarly, if a 10-message cluster contains 3 spam emails and 7 non-spam emails, its proportion P according to eq. [4] is also 0.7.

In a step 330 (FIG. 11), classification parameter manager 190 checks whether the last k value has been considered. If no, steps 312, 314, 316, 318, 322, 326, 328, and 330 are repeated for a new number k of clusters/centroids.

Performing the above sequence of steps for the range of k values ($k \in [K-\epsilon, K+\epsilon]$) yields a set of j centroids, with $$j = \sum_{k \in [K-\varepsilon, K+\varepsilon]} k. \quad [5]$$

The set of j centroids may be ordered by relevance. The set of j centroids includes centroids generated using different values of k, i.e. different numbers of classes. While different clusters corresponding to the same value of k generally do not overlap, some clusters corresponding to different values of k may overlap completely or partially. For example, some of the clusters generated in different runs using 50 classes and 51 classes (k=50, k=51) may be identical or almost identical. Keeping clusters generated using different values of k in the final data set is useful in reducing the sensitivity of the clustering process to an appropriate choice of k.

In a step 340, cluster filtering manager 198 (FIG. 9) performs a set of filtering and redundancy removal operations on the set of j clusters of classification parameter set 58. The filtering and redundancy removal operations serve to remove at least some of the overlap between different clusters.

Figure 12:
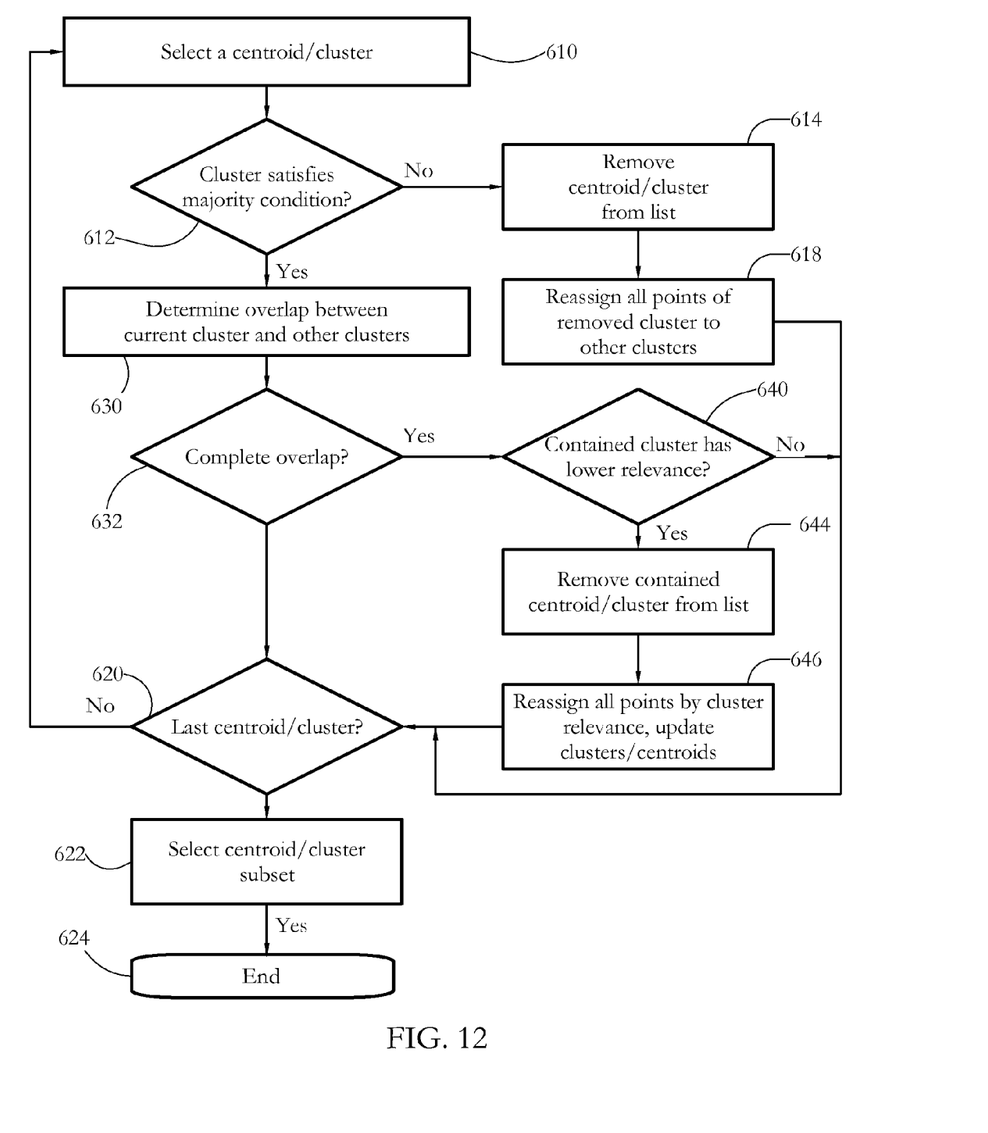
FIG. 12 shows a sequence of collection (cluster) filtering steps performed by a cluster filtering manager of the classification parameter manager of FIG. 9 according to some embodiments of the present invention.

FIG. 12 shows an exemplary set of filtering and redundancy removal operations according to some embodiments of the present invention. A centroid and associated cluster of classification parameter set 58 are selected for analysis (step 610), and a determination is made whether the selected cluster satisfies a class dominance (majority) condition (step 612). The dominance condition may be that the cluster's dominance proportion given by eq. [4] exceeds a predetermined value, e.g. ⅔. If the dominance condition is not met, the centroid is removed from classification parameter set 58 (step 614), and all cluster points are reassigned to other clusters as described above (step 618). In a step 620, it is determined whether there are any clusters left to be analyzed. If there are clusters left to be analyzed, a new centroid/cluster is selected (step 610), and the process is repeated.

If the current cluster is determined in step 612 to satisfy the dominance condition, an overlap between the current cluster and other clusters is determined (step 630). In a step 632, a determination is made whether the overlap is complete. The overlap is complete when one cluster is completely contained within the other, i.e. all members of one cluster are also members of the other. If the overlap is complete, it is determined whether the contained cluster has a lower relevance than the containing cluster (step 640). If the contained cluster has a higher relevance, the process continues to step 620. If the contained cluster has a lower relevance, its centroid is removed from classification parameter set 58 (step 644). The points of the removed cluster are reassigned to other clusters, and the remaining clusters/centroids are updated to reflect the reassignment (step 646). Updating the clusters/centroids may include updating centroid positions and cluster relevance values. If the overlap is only partial, both clusters are kept, but a given future vector to be classified will generally be assigned to only one of the clusters according to the cluster relevance values and the future vector coordinates, as described below.

A result of the process described above is a list of centroid/clusters, ordered by relevance (eq. [2]). In a step 622, a subset of high-relevance clusters/centroids is kept for use in classifying new messages, while the rest of the clusters/centroids are discarded. In some embodiments, the selected subset may include a predetermined number of clusters/centroids at the top of the ordered list. The predetermined number may be empirically determined, and/or may be set to be a function of the k-range central value K, for example may be set to be equal to K. As an example, in an embodiment in which 20 runs are performed with k values between 90 and 110, the selected clusters may be set to be the top 100 clusters from the ordered list of the cumulative run results. In some embodiments, the selected clusters may be set to be clusters whose relevance meet a predetermined relevance criterion, e.g. whose relevance exceed a threshold value. The process ends (step 624) with an ordered list of clusters/centroids having a relatively-high relevance to separating spam from non-spam. These clusters are used to classify new messages as described below.

Figure 13:
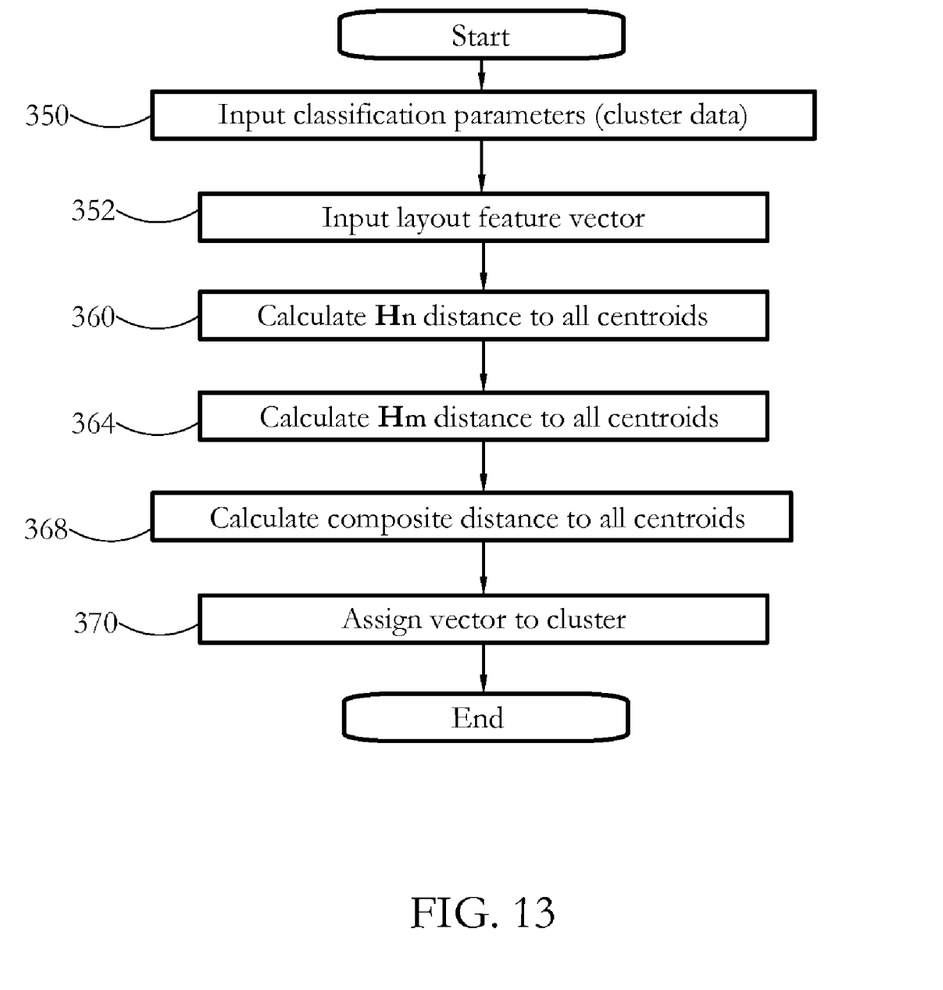
FIG. 13 shows a sequence of steps performed by a vector classifier of the classification parameter manager of FIG. 9 according to some embodiments of the present invention.

An exemplary flowchart of the operation of the vector classifier used during the training phase (vector classifier 166 in FIG. 9) is shown in FIG. 13. In a step 350, the coordinates of all cluster centroids are read from the classification parameter set 58. In a step 352 the current layout feature vector 64 is input. In a step 360, hyperspace distance calculator 178 computes the $H_n$ distance between layout vector 64 and all cluster centroids. Hyperspace distance calculator 178 computes the $H_m$ distance between layout vector 64 and all cluster centroids (step 364). In a step 368, a composite distance is computed by summing or otherwise combining (e.g. linearly combining) the $H_n$ and $H_m$ distances. Finally, in a step 370, the current message (layout vector) is assigned to the closest centroid.

In some embodiments, the operation of the vector classifier 66 forming part of the client-side layout analysis engine 40 (FIG. 5) is similar to that shown in FIG. 13, with the exception of the cluster assignment step (step 370 in FIG. 13). In client-side classification, a new layout vector is assigned to the highest-relevance centroid whose average composite distance to its cluster points is longer than its composite distance to the new layout vector (i.e. to the highest-relevance cluster for which the point also lies within a cluster core). If no centroid is close enough to the new message, then the new message may be classified as unknown. For example, a new message having $10^4$ lines is unlikely to be found within the space spanned by the training layout vectors; such a message may be classified as unknown. Assigning the new vector to a cluster includes generating layout classification indicator (LCI) 56 (FIG. 5).

The exemplary systems and methods described above allow training a message classification system such as an anti-spam filter to classify new email messages according to their layouts. The particular layout features that are useful in separating spam from legitimate email or in performing other desired classifications may be determined dynamically, by training a classification filter using an externally-classified email corpus. The classification filter may also evolve over time, as relevant layout features of email messages change.

In general, an optimal number of distinct classes needed to capture a diversity of a set of email messages may not be known a priori. For example, both legitimate and spam email may come in many different layouts, hence there will typically be more than one message subclass representing legitimate email, and more than one subclass representing spam. At the same time, the performance of a classification scheme may be sensitive to the number of defined classes. Performing a training process for multiple total numbers of defined classes allows reducing the sensitivity of the classification scheme to errors in class number choice. The exemplary systems and methods described above allow making use of clusters generated in different k runs (runs for different numbers of classes), by ranking a total set of j clusters by relevance, and removing at least some redundancies between clusters by assigning points to higher-relevance clusters.

Defining a layout vector hyperspace as a combination of a numerical-scalar (Euclidean) subspace ($H_n$) and a list- or tree-scalar (edit-distance) subspace ($H_m$) allows incorporating both global feature counts and information on relative feature relationships in a layout feature vector representing an email message layout. Message similarities may then be evaluated according to distances in the combined hyperspace. Such distances may include components based on Manhattan or Euclidean distances for vector components having numerical scalars, and edit distances for vector components having list/tree scalars. Similarly, layout feature clusters may be defined by centroid vectors having an averaged-coordinate component for numerical values, and a representative-coordinate component for lists.

Different types of email messages normally reside in different regions of this combined feature space. Illustratively, legitimate email messages may come predominantly in letter-like form, while advertising messages may tend to use unusual graphic layouts to attract attention. Layout feature vectors defined for such messages may be situated relatively far apart in the combined layout feature space, and thus would be assigned to different layout clusters.

It will be clear to one skilled in the art that the above embodiments may be altered in many ways without departing from the scope of the invention. Accordingly, the scope of the invention should be determined by the following claims and their legal equivalents.

What is claimed is:

1. A non-transitory computer-readable medium encoding instructions which, when executed by a computer system, cause the computer system to:

parse an electronic text document to generate a document vector for the electronic text document, wherein the document vector includes a feature count component and a feature position component, wherein the feature count component includes a plurality of feature count indicators for the electronic text document, wherein the feature position component includes a data structure selected from a group consisting of an ordered list and a tree of document substructure indicators, each document substructure indicator denoting a type of substructure in the electronic text document, and wherein a position of said each document substructure indicator in the data structure characterizes a position of a corresponding substructure in the electronic text document;

determine a plurality of composite hyperspace distances between the document vector and a plurality of reference vectors, each composite hyperspace distance being defined between the document vector and a reference vector of the plurality of reference vectors, wherein each composite hyperspace distance is a function of a Euclidean-space distance dependent on the feature count component of the document vector and of an edit distance dependent on the feature position component of the document vector; and classify the electronic text document according to at least one of the plurality of composite hyperspace distances.

2. The computer-readable medium of claim 1, wherein the Euclidean-space distance is a Euclidean distance or a Manhattan distance.

3. The computer-readable medium of claim 1, wherein said each composite hyperspace distance is equal to a sum of the Euclidean-space distance and the edit distance.

4. The computer-readable medium of claim 1, wherein the plurality of feature count indicators comprises at least one indicator selected from a group consisting of a size of the electronic text document, a number of new lines, a number of blank lines, a number of links, and a number of email addresses in the electronic text document.

5. The computer-readable medium of claim 4, wherein each document substructure indicator in the data structure denotes a type of text line in the electronic text document.

6. The computer-readable medium of claim 1, wherein each reference vector represents a cluster of electronic text documents.

7. The computer-readable medium of claim 1, wherein the electronic text document is an electronic mail message.

8. The computer-readable medium of claim 7, wherein classifying the electronic text document comprises determining whether the electronic text document is spam or non-spam.

9. A method comprising employing a computer system to:

parse an electronic text document to generate a document vector for the electronic text document, wherein the document vector includes a feature count component and a feature position component, wherein the feature count component includes a plurality of feature count indicators for the electronic text document, wherein the feature position component includes a data structure selected from a group consisting of an ordered list and a tree of document substructure indicators, each document substructure indicator denoting a type of substructure in the electronic text document, and wherein a position of said each document substructure indicator in the data structure characterizes a position of a corresponding substructure in the electronic text document;

determine a plurality of composite hyperspace distances between the document vector and a plurality of reference vectors, each composite hyperspace distance being defined between the document vector and a reference vector of the plurality of reference vectors, wherein each composite hyperspace distance is a function of a Euclidean-space distance dependent on the feature count component of the document vector and of an edit distance dependent on the feature position component of the document vector; and classify the electronic text document according to at least one of the plurality of composite hyperspace distances.

10. A non-transitory computer-readable medium encoding instructions which, when executed by a computer system, cause the computer system to:

generate an electronic communication feature count indicator comprising a plurality of feature counts for the electronic communication;

generate a text line structure indicator characterizing a line structure of the electronic communication, the text line structure indicator comprising a data structure selected from a group consisting of an ordered list and a tree of text line type indicators, a position of each text line type indicator in the data structure being indicative of a position of a corresponding text line type in the electronic communication;

determine a composite hyperspace distance between a vector representing the electronic communication and a predetermined vector, the hyperspace distance being a function of a Euclidean-space distance dependent on the feature count indicator, and of an edit distance dependent the text line structure indicator; and classify the electronic communication according to the composite hyperspace distance.

11. A method comprising employing a computer system to:

generate an electronic communication feature count indicator comprising a plurality of feature counts for the electronic communication;

generate a text line structure indicator characterizing a line structure of the electronic communication, the text line structure indicator comprising a data structure selected from a group consisting of an ordered list and a tree of text line type indicators, a position of each text line type indicator in the data structure being indicative of a position of a corresponding text line type in the electronic communication;

determine a composite hyperspace distance between a vector representing the electronic communication and a predetermined vector, the hyperspace distance being a function of a Euclidean-space distance dependent on the feature count indicator, and of an edit distance dependent the text line structure indicator; and classify the electronic communication according to the composite hyperspace distance.

12. The method of claim 11, wherein the Euclidean-space distance is a Euclidean distance or a Manhattan distance.

13. The method of claim 11, wherein the composite hyperspace distance is equal to a sum of the Euclidean-space distance and the edit distance.

14. The method of claim 11, wherein the feature count indicator comprises at least one indicator selected from a group consisting of a size of the electronic communication, a number of new lines, a number of blank lines, a number of links, and a number of email addresses in the electronic communication.

15. The method of claim 11, wherein each document substructure indicator in the data structure denotes a type of text line in the electronic text document.

16. The method of claim 11, wherein each reference vector represents a cluster of electronic text documents.

17. The method of claim 11, wherein the electronic text document is an electronic mail message.

18. The method of claim 11, wherein classifying the electronic communication comprises determining whether the electronic communication is spam or non-spam.

* * * * *